(12) United States Patent
Easby

(10) Patent No.: US 6,220,153 B1
(45) Date of Patent: Apr. 24, 2001

(54) AUTOMATED PEELER FOR FRUIT PRODUCTS

(75) Inventor: Owen John Easby, Banora Point (AU)

(73) Assignee: Kingslink USA, Inc., Branford, CT (US)

( * ) Notice: Subject to any disclaimer, the term of this patent is extended or adjusted under 35 U.S.C. 154(b) by 0 days.

(21) Appl. No.: 09/658,891

(22) Filed: Sep. 11, 2000

(51) Int. Cl.[7] ..................................................... A23N 7/00
(52) U.S. Cl. ............................... 99/541; 99/584; 99/585; 99/587; 99/589; 99/588; 99/590; 99/594
(58) Field of Search ........................... 99/539–541, 567, 99/584–586, 587–592, 623–630; 426/481–483

(56) References Cited

U.S. PATENT DOCUMENTS

| | | | | |
|---|---|---|---|---|
| 1,284,132 | * | 11/1918 | Nikolow | 99/544 |
| 1,399,950 | * | 12/1921 | Fish | 99/545 |
| 3,504,720 | * | 4/1970 | Mason | 99/538 |
| 3,780,435 | * | 12/1973 | Farha et al. | 99/564 |
| 3,933,085 | * | 1/1976 | Rejsa | 99/589 |
| 4,108,565 | * | 8/1978 | Janssen | 99/593 |
| 4,352,325 | * | 10/1982 | Pleus | 99/545 |
| 5,060,563 | * | 10/1991 | Plant et al. | 99/544 |
| 5,102,678 | * | 4/1992 | Plant et al. | 426/481 |
| 5,181,458 | * | 1/1993 | Plant et al. | 99/538 |
| 5,228,397 | * | 7/1993 | Plant et al. | 99/589 X |
| 5,275,071 | * | 1/1994 | Plant et al. | 82/1.11 |
| 5,454,301 | * | 10/1995 | Rainey et al. | 99/544 |
| 6,116,155 | | 9/2000 | Harding | 99/541 |

* cited by examiner

Primary Examiner—Timothy F. Simone
(74) Attorney, Agent, or Firm—Melvin I. Stoltz

(57) ABSTRACT

By providing fruit processing apparatus comprising rotatable movement control members and a U-shaped cutting blade cooperatively associated therewith, high speed, efficient and automatic removal of skins and seeds from a fruit segment is efficiently achieved. The rotatable movement control members receive the fruit segment with the cutting blade positioned along the junction between the skin and the edible fruit portion. Then, the fruit segment is arcuately pivoted, causing the blade to pass between the juncture surface, completely separating the skin from the fruit. If desired, a seed sack removal member is also employed for removing and separating the seeds from the edible fruit.

20 Claims, 4 Drawing Sheets

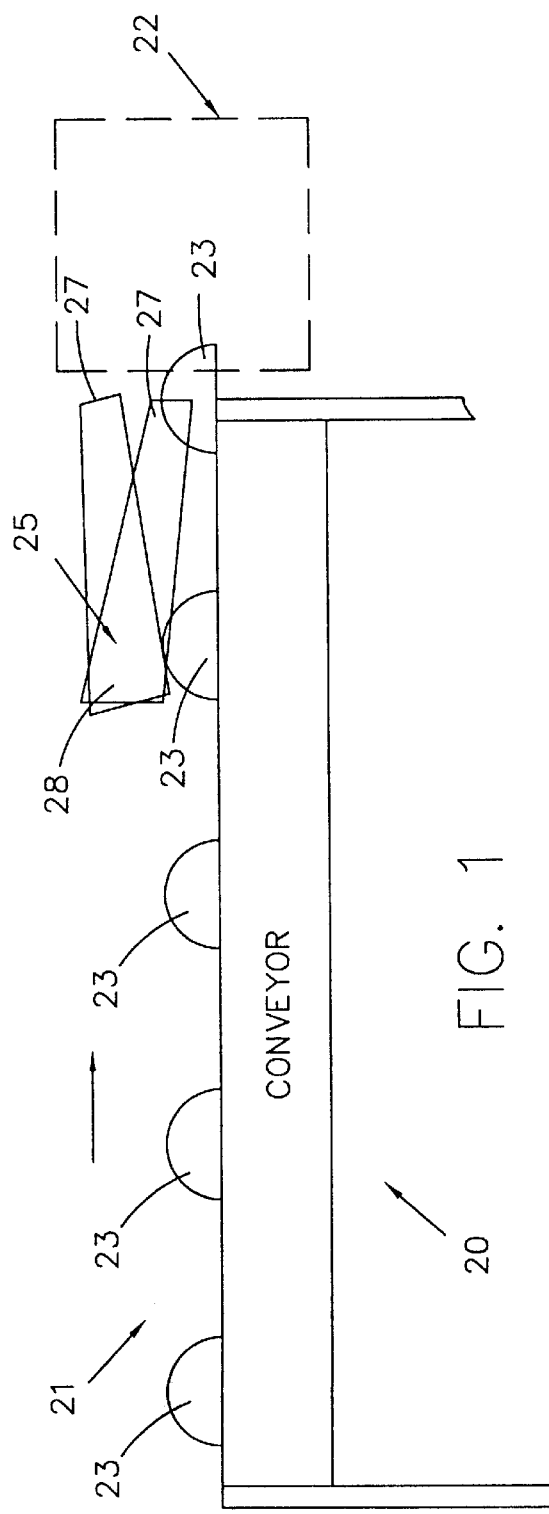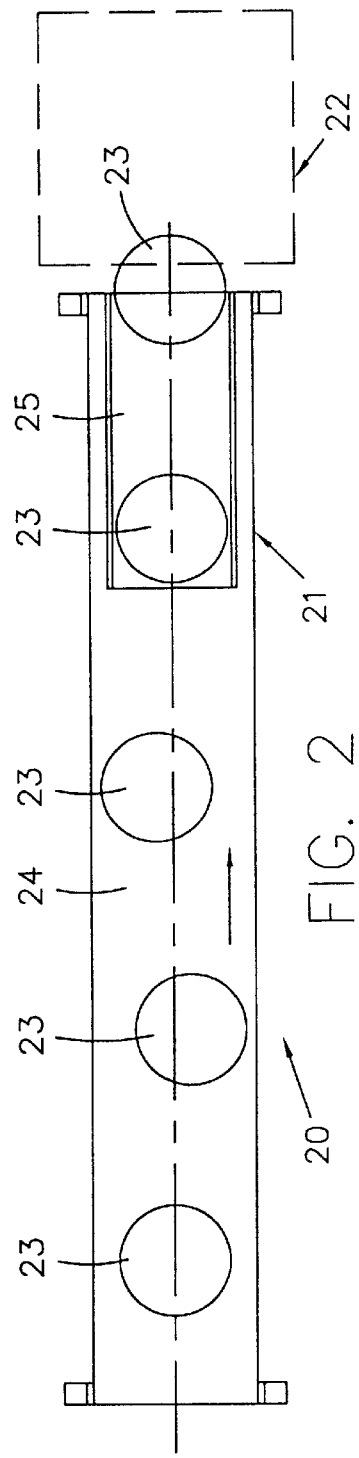

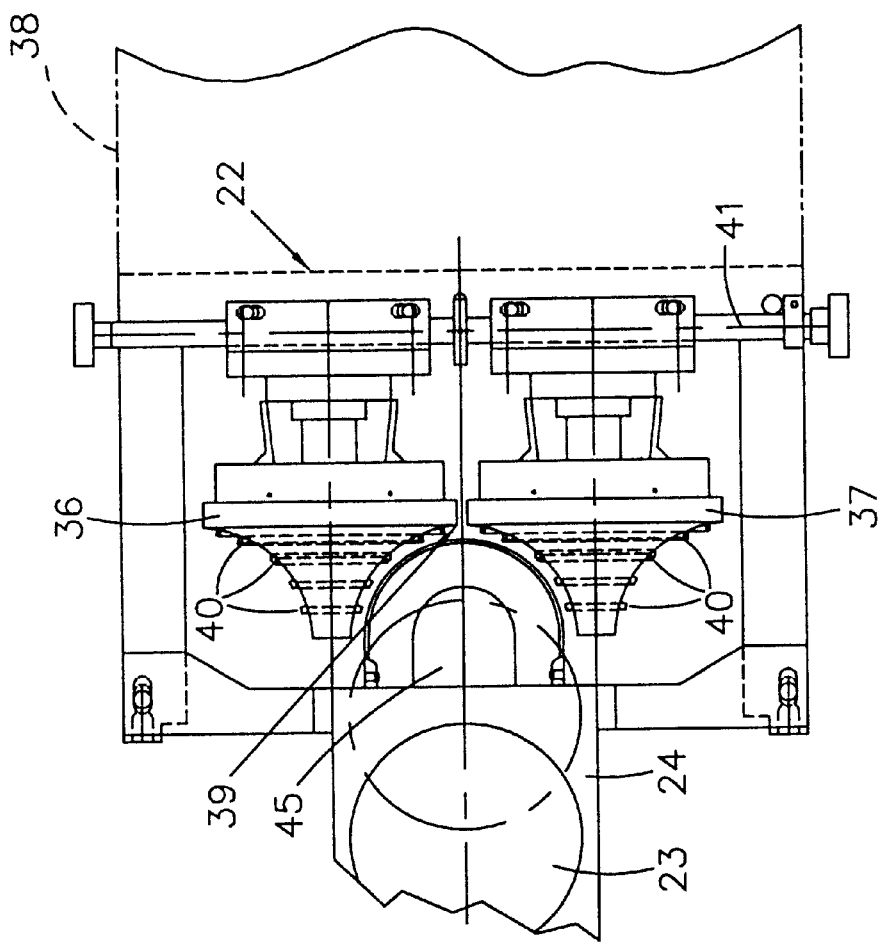
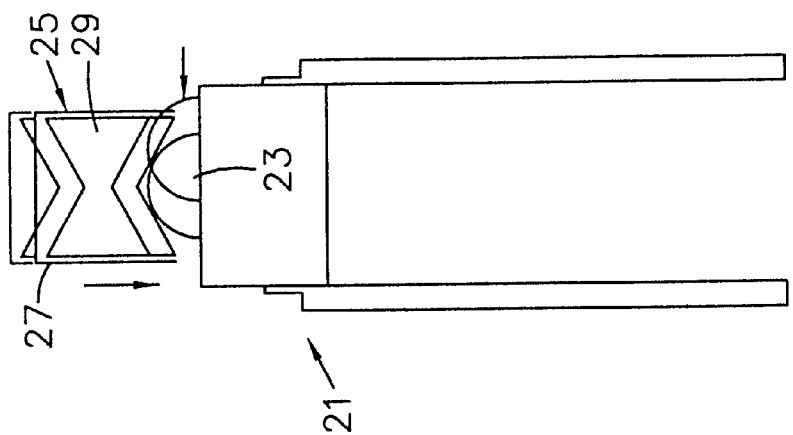

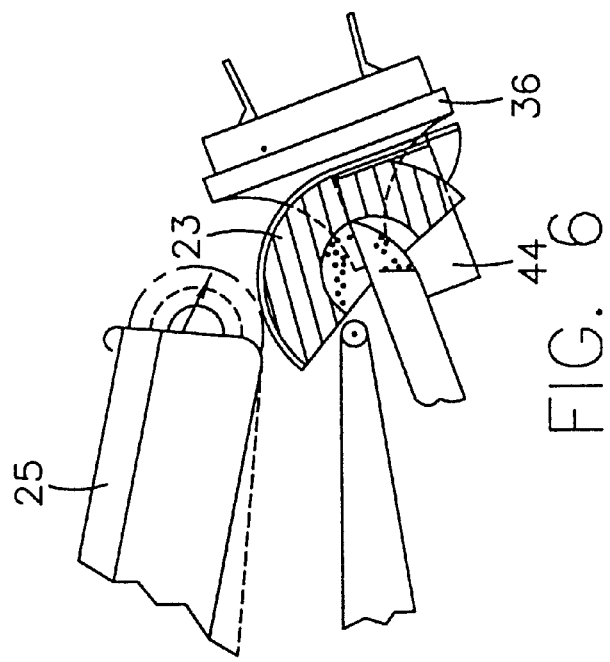
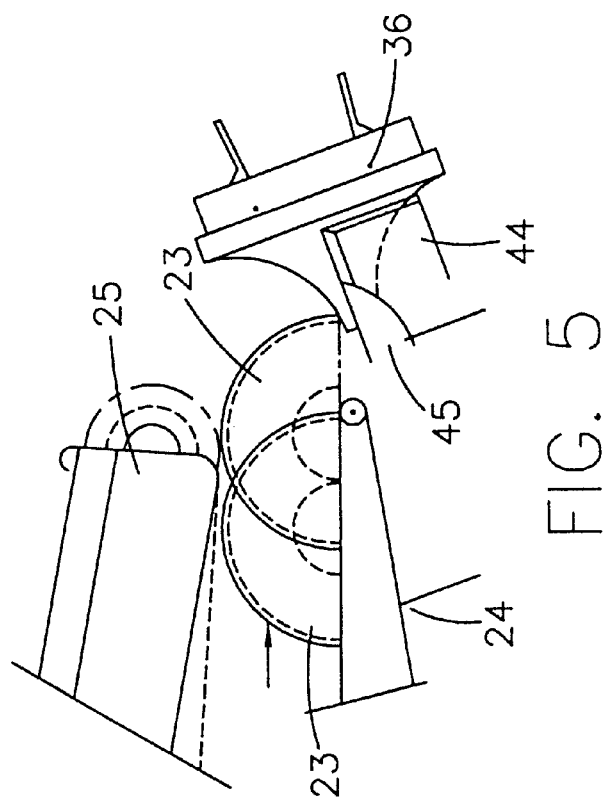

AUTOMATED PEELER FOR FRUIT PRODUCTS

TECHNICAL FIELD

This invention relates to fruit processing equipment, and more particularly, to unique methods and apparatus for separating the fruit from the outer skin and seeds by automatically peeling the fruit, removing seeds, and separating each component from the other.

BACKGROUND ART

The canning or packaging of various fruits in ready-to-eat sections or slices is well known in the art and has been practiced for several decades both in the United States and in other countries. In fact, in about the 1930's, fruit canning began in the United States and was subsequently expanded to include the sectioning and slicing of fruits and the packaging of the fruit in containers and for being maintained under refrigerated or chilled conditions in order to provide fresh fruit sections and slices.

When this industry began in the United States, most of the operations on the fruit for peeling and sectioning the fruit was achieved by hand labor. Since the cost of hand labor, at that time, was reasonably priced, the fruit could be processed in this manner. However, as hand-labor costs increased, efforts were expended in automating the peeling and sectioning of the fruit. This activity resulted in several automated fruit scoring, slicing, and coring machines to be developed.

In spite of these efforts to develop equipment for automating the peeling, seed removal, sectioning and/or slicing of fruit, these efforts were not successful and most of the fruit processing business became dominated by production in foreign countries where labor was substantially less expensive than in the United States. This ultimately resulted in most of the fruit processing business in the United States being terminated. Presently, only a handful of processing plants remain in the United States, with foreign competition continuing to exert substantial pressure on the ability of these U.S. manufacturing facilities to produce fruit sections and slices at competitive prices.

Therefore, it is a principal object of the present invention to provide a unique method and apparatus for processing fruit in a highly efficient and low cost manner.

Another object of the present invention is to provide a unique method and apparatus for processing fruit having the characteristic features described above which is capable of being employed in a substantially fully automated manner, with a minimum of hand labor requirements.

Another object of the present invention is to provide a unique method and apparatus for processing fruit having the characteristic features described above which is capable of automatically removing and separating the outer skin and seeds form the edible fruit portion and transferring each component to separate receiving zones.

Another object of the present invention is to provide a method and apparatus for processing fruit having the characteristic features described above which is capable of producing fruit slices or sections with production yields substantially greater than any other prior art method or system.

Other and more specific objects will in part be obvious and will in part appear hereinafter.

SUMMARY OF THE INVENTION

By employing the present invention, all of the difficulties and drawbacks found in prior art systems are completely overcome and a substantially improved apparatus is attained for completely processing fruit by removing the outer skin and the seeds and separating the skin and seeds from the edible fruit portion. Although virtually all types of fruits can be employed using the present invention, the present invention is particularly applicable to the high-speed processing of honeydews, papayas, grapefruits, cantaloupes, mangos, and the like.

In accordance with the present invention, high-speed, fully automated processing of fruit is attained by simultaneously removing the seeds and outer skin from the fruit, and directing the removed seeds and skin to separate zones for disposal. The edible fruit portion is transferred to a separate zone for further processing.

In order to attain this high-speed, automated fruit processing, the fruit is first sliced in half prior to advancing the fruit to the processing equipment. This slicing step may be performed manually or using automated equipment. In addition, once the fruit has been sliced in half, the fruit is placed with the sliced portion facing downwardly on the conveyor system, for advancing the sliced fruit segment to the processing equipment. In addition, in the preferred embodiment, automatic centering equipment is employed for aligning the sliced fruit segments with the center zone of the conveyor.

In order to achieve the separation of the edible fruit from seeds and the skin of the fruit, the sliced fruit segment is advanced on the conveyor to the processing equipment of the present invention. In the preferred embodiment of the present invention, the fruit processing equipment is constructed for receiving the sliced fruit segment, with the open, cut surface of the fruit being placed in cooperating relationship with a seed scooping member, a peeling blade, and movement control means. In those instances where the fruit does not contain seeds, the seed scooping member is removed.

In accordance with the present invention, the movement control means frictionally contacts the outer surface of the sliced fruit segment and controllably, arcuately pivots the sliced fruit segment substantially about the center point of the fruit segment. This arcuate movement causes the skin cutting blade to enter the boundary between the inside surface of the skin and the outside surface of the edible portion of the fruit.

As in the fruit segment is arcuately pivoted, the cutting blade advances along this intersection surface or boundary until the entire outer skin has been removed. Simultaneously therewith, the seed scooping member engages the centrally located seed sack of the fruit and scopes the seeds away from the edible fruit portion as of the segment is arcuately pivoted in engagement with the skin cutting blade.

Once the fruit segment has been arcuately pivoted through 180°, the outer skin of the fruit segment has been completely removed as well as the centrally positioned seeds. Furthermore, with control chutes or channels cooperatively associated with the seed scoop and the skin cutting blade, both of these components are automatically fed to receiving containers for subsequent disposal, while the edible fruit portion is delivered to a processing zone.

In the preferred embodiment, the cutting blade employed for removing the outer skin surface of the fruit in a continuous, one step process comprises a thin, narrow, arcuately curved or horseshoe-shaped member. Once a cutting blade having the desired overall diameter for the particular fruit segment being processed has been selected and mounted in position, the flexibility of the cutting blade and fruit automatically adjusts for any minor dimensional differences between fruit segments, enabling the cutting blade to and enter the boundary between the inside surface of the outer skin and the outside surface of the edible fruit portion, and follow this curved surface as the fruit is arcuately pivoted relative to the fixed cutting blade. Once completely pivoted through 180°, the outer skin is completely severed from the fruit, leaving the edible fruit portion for subsequent use, as desired.

Similarly, by constructing a seed scoop member with the proper dimensions, any seeds or seed sacks centrally located in the fruit segment are quickly and easily removed from the edible fruit portion simultaneously with the removal of the outer skin. As a result, the processing equipment of the present invention provides the desired high speed, efficient and fully automatic removal of outer skin surfaces and seeds from all desired fruit, with the edible portion of the fruit being advanced as desired for further processing.

In accordance with the present invention, in order to provide the desired controlled arcuate movement of the fruit segment relative to the cutting blade and seed scoop member, two, juxtaposed, spaced, cooperating movement control members are employed. In the preferred embodiment, the movement control members are preferably formed as elongated rotating spindles each of which comprise a leading surface having an arcuately curved, concave shape. By placing the movement control members in juxtaposed, spaced, side to side relationship, the cooperating, arcuately curved, concave shape of each spindle member forms a generally U-shaped receiving zone for receiving and engaging the outer surface of the fruit segment.

In addition, in the preferred embodiment, each arcuately curved surface of each spindle member comprises a plurality of radially extending fingers constructed for engaging the outer surface of the fruit and assuring controlled, frictional interengagement therewith. In this way, the desired controlled movement of the fruit segment is assured as the spindle is rotated about its central axis.

By employing this construction, the precisely desired movement of the fruit segment is assured and the controlled removal of the outer skin surface and the seeds during the movement of the fruit is provided. As a result, the precisely desired high-speed processing of the fruit segment is realized.

The invention accordingly comprises the features of construction, combinations of elements and arrangement of parts which will be exemplified in the construction hereinafter set forth, and the scope of the invention will be indicated in the claims.

THE DRAWINGS

For a fuller understanding of the nature and objects of the invention, reference should be had to the following detailed description taken in connection with the accompanying drawings, in which:

FIG. 1 is a side elevation view of the fruit processing system of the present invention;

FIG. 2 is a top plan view of the fruit processing system of FIG. 1;

FIG. 3 is a side elevation view of the conveyor system shown in FIG. 1 and forming a part of the fruit processing system;

FIG. 4 is a top plan view, partially broken away, showing the fruit peeling head die dramatically shown in FIG. 1 and forming a part of the fruit processing system of the present invention;

FIG. 5 is a side elevation view, partially broken away, of the fruit peeling head shown in FIG. 4; and FIGS. 6 and 7 are side elevation views similar to FIG. 5 of the fruit peeling head depicting the progress of a fruit segment therewith, as well as fruit component receiving and holding members.

DETAILED DISCLOSURE

Figure 7:
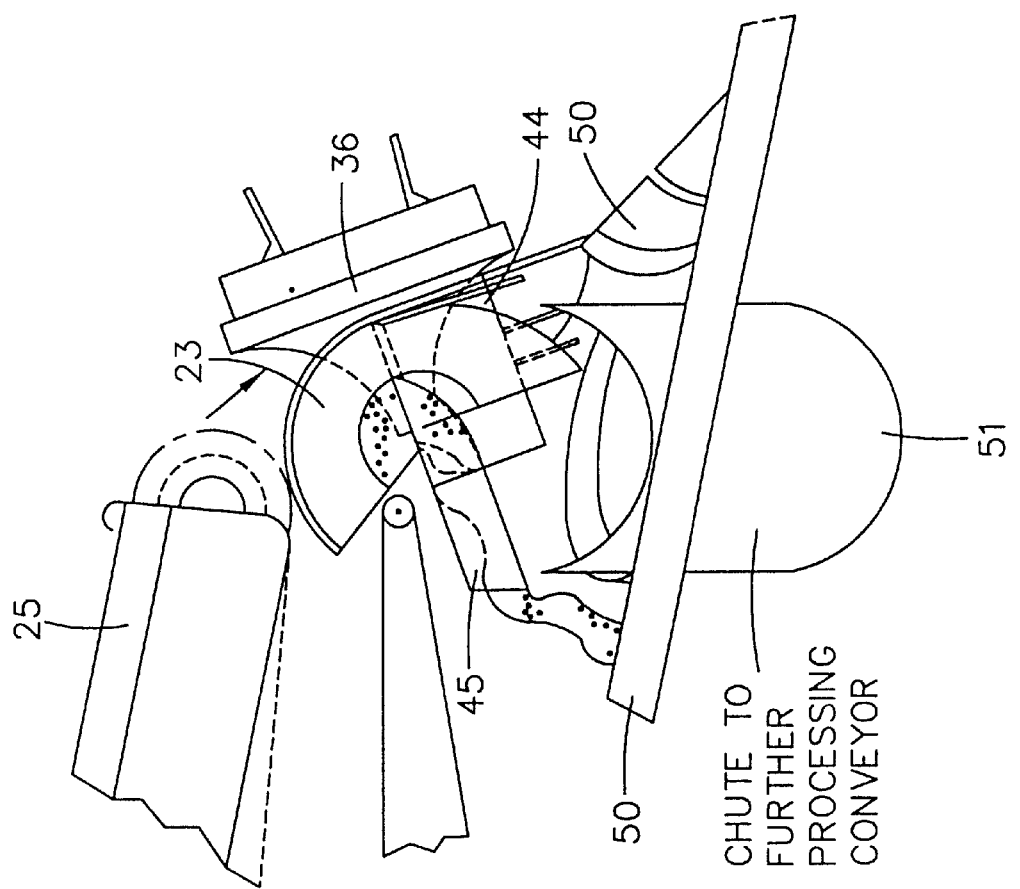

By referring to FIGS. 1–7, along with the following detailed disclosure, the construction and operation of the preferred embodiment of the present invention can best be understood. Although the preferred construction is fully detailed herein, alternate constructions can also be implemented without departing from the scope of this invention. Consequently, it is to be understood that the following detailed disclosure exemplifies the preferred embodiment of the present invention, while the scope of the present invention encompasses all variations thereof.

In FIGS. 1–3, conveyor system 21 is fully depicted continuously advancing and controllably moving the desired fruit in the desired manner. In addition, FIGS. 4–7 fully depict the construction and operation of the fruit peeling head 22. As is evident from this disclosure, fruit processing system 20 of the present invention incorporates the combination of conveyor system 21 and the fruit peeling head 22. Although the components forming fruit processing system 20 are only diagrammatically depicted in FIGS. 2 and 2, it is to be understood that these components are integrated with each other to provide fruit processing system 20 of the present invention.

In employing fruit processing system 20 of the present invention, desired fruit 23 is preferably cut in half and placed on conveyor belt 24 of conveyor system 21 with the opened, sliced surface facing downwardly, in contact with conveyor belt 24. Using a generally conventional construction, conveyor belt 24 comprises an endless belt system which is rotationally driven in order to enable fruit 23 placed thereon to be continuously advanced in the desired direction.

As discussed above, the present invention is constructed for removing the outer skin and inner seed pocket or seed sack of virtually any fruit. Although any fruit may be processed in the manner detailed herein, the present invention is particularly applicable to the high-speed processing of fruit selected from the group consisting of honeydews, papayas, grapefruit, cantaloupes, and mangos. In this regard, when processing fruit having a center pit, such as mangos, the pit is removed when the fruit is sliced in half.

In FIGS. 1–7, the processing of melons, such as honeydews or cantaloupes, are depicted. However, this depiction is for illustrative purposes only and is not intended as a limitation of the present invention.

In the preferred operation of the present invention, sliced fruit halves 23 are automatically positioned substantially along the central axis of conveyor belt 24 prior to being advanced into controlled engagement with fruit peeling head 22. In order to assure the desired placement of each fruit half 23, automatic centering head 25 is mounted near the delivery end of conveyor system 21.

In the preferred construction, centering head 25 comprises an elongated arm member 27 which is held in position by conventional support means (not shown), mounted for being arcuately pivotable about a mounting axis 28. In this way, arm member 27 is movable between two alternate positions, shown in FIG. 1 as a lowered position and a raised position. In addition, as shown in FIG. 3, arm member 27 incorporates V-shaped, elongated endless loop belt 29, which is constructed for continuous guiding movement of fruit half 23 throughout the length of arm member 27 in the same directions as conveyor belt 24.

By employing this construction, any fruit half 23 positioned on conveyor belt 24 is advanced into engagement with the bottom leading edge of centering head 25, causing the outer surface of the fruit to be engaged with V-shaped belt 29. In addition, due to the arcuate pivotability of arm member 27, arm member 27 automatically adjusts to the size and shape of the fruit half 23, while assuring continuous contact with the surface of the fruit.

Due to the construction of belt 29, each fruit half 23 is automatically moved into position along the central axis of conveyor belt 24 due to the engagement with and passage of the fruit through centering head 25. When each fruit half 23 engaged the V-shaped belt 29 of centering head 25, each fruit half 23 automatically slides to the center of conveyor belt 24 due to the difficulty in being engaged with a sloping surface of belt 29. By employing this construction, each fruit half 23 moves to the center of V-shaped belt 29, assuring that each fruit half exiting centering head 25 into engagement with processing head 22 is positioned substantially along the central axis of conveyor system 21, as desired.

By referring to FIGS. 4–7, along with the following detailed discussion, the construction and operation of fruit peeling head 22 can best be understood. As shown therein, fruit peeling head 22 comprises two spindle members 36 and 37 which are supported on a frame assembly and are positioned in juxtaposed, spaced, cooperating relationship with conveyor belt 24 and centering head 25. In addition, spindles 36 and 37 are both mounted for rotational movement about their central axis, being rotationally driven by drive assembly 38 which in FIG. 4 in phantom.

In the preferred construction, spindles 36 and 37 each comprise a forward or leading profile or configuration which is substantially defined by a truncated conical shape, having an arcuately curved, concave side surface. In the preferred configuration, the side surface of each spindle 36 and 37 comprises a radius of curvature ranging between about 70° and 90°. In addition, with spindles 36 and 37 being positioned directly adjacent each other, a substantially U-shaped receiving zone 39 is formed therebetween, dimensioned for receiving and controllably moving fruit half 23.

As shown in FIG. 4, each spindle member 36 and 37 incorporates a plurality of pins 40 extending outwardly from the arcuately curved surface thereof. Each pin 40 formed in spindle member 36 and 37 is preferably constructed with a flat or dull exposed terminating end. In this way, pin members 40 provide secure, frictional engagement with the out surface of fruit half 23, assuring that the fruit is capable of being controllably moved by spindles 36 and 37 while also assuring that the outer skin surface of the fruit is not punctured or damaged.

Furthermore, in the preferred construction, spindles 36 and 37 are mounted on support shaft 41, and are adjustably movable thereon. In this way, U-shaped zone 39 is easily adjusted in order to accommodate fruit of any size or dimension.

As shown in FIGS. 5, 6, and 7, fruit peeling head 22 is positioned directly adjacent conveyor belt 24 and centering head 25 in a manner which assures that fruit halves 23 are delivered directly from conveyor belt 24 and centering head 25 to U-shaped zone 39 formed between adjacent spindle members 36 and 37. In this way, rapid, efficient, expeditious, and high-speed processing of the fruit is provided. In addition, in order to assure that fruit halves 23 are delivered directly from conveyor belt 24 to fruit peeling head 22, peeling head 22 and/or conveyor belt 24 are adjustable relative to each other, thereby assuring that fruit having any size or dimension is properly transferred from conveyor belt 24 to peeling head 22.

In the preferred embodiment, fruit peeling head 22 also incorporates a flexible, arcuately curved, thin, narrow, elongated cutting blade 44 which is supportingly mounted and maintained in juxtaposed, spaced, cooperating relationship with spindles 36 and 37 in U-shaped zone 39. As best seen in FIG. 4, cutting blade 44 is preferably positioned in juxtaposed, spaced, adjacent relationship to pins 40 of spindles 36 and 37.

In addition, since cutting blade 44 preferably comprises a thin, elongated, narrow, arcuately curved member supported at its opposed ends, cutting blade 44 comprises a fixed radius of curvature which is selected for being substantially equivalent to the radius of curvature defined by the fruit segment being processed. In order to match this radius of curvature as closely as possible, a plurality of blade members are available and the blade member comprising the closest radius of curvature is selected and mounted in place. In this way, the most suitable blade is selected and employed.

In addition to incorporating cutting blade 44, fruit peeling head 22 also incorporates seed scoop member 45 which is supportingly maintained in juxtaposed, spaced, cooperating relationship with cutting blade 44. As best seen in FIGS. 4, 6, and 7, seed scoop member 45 is positioned within U-shaped receiving zone 39, in front of cutting blade 44 and spaced away from cutting blade 44 a distance substantially equal to the thickness of the edible fruit portion of fruit 23.

In this way, as further detailed below, seed scoop member 45 is able to contact the seed sack of the fruit being processed and remove the seeds from the fruit. In order to enable seed scoop to member 45 to be capable of accommodating any desired fruit being processed, seed scoop member 45 is movably adjustable relative to spindles 36 and 37 as well as cutting blade 44 in order to be sure that the precisely desired position is established for removing any seeds contained within fruit 23.

By employing the construction detailed above, any desired fruit is capable of being processed in a high-speed, efficient manner, with the outer skin and the seed sack being separated from the edible fruit portion thereof. By referring to FIGS. 4, 5, 6, and 7, along with the following detailed discussion, the operation of the present invention, in general, and fruit peeling head 22, in particular, can best be understood.

As shown in FIGS. 4 and 5, fruit half 23 is advanced by conveyor belt 24 and centering head 25 into cooperating engagement with cutting blade 44, seed scoop member 45, and spindles 36 and 37 of fruit peeling head 22. Once fruit half 23 has been fully advanced into engagement with fruit peeling head 22, the outer skin of fruit half 23 is brought into contact with pins 40 of spindles 36 and 37. Once in this position, cutting blade 44 is mounted in contact with the lower surface of fruit half 23, positioning at the juncture between the inside surface of the skin and the outside surface of the edible fruit portion of fruit half 23. In addition, seed scoop member 45 is positioned in contact with, or in close proximity to, the inside surface of the edible fruit portion of fruit 23.

Once fruit half 23 has been advanced into the precisely desired position with pins 40 frictionally engaging the outer skin surface of the fruit to provide the desired controlled movement of thereof, spindles 36 and 37 are activated for rotational movement in opposite directions about their respective central axes. In this regard, spindle 36 arcuately rotates in a clockwise direction, while spindle 37 arcuately rotates in a counter-clockwise direction. As a result of this simultaneous movement of spindles 36 and 37, fruit half 23 is forced downwardly into engagement with cutting blade 44 and seed scoop member 45 in a manner which causes fruit half 23 to be arcuately rotated about the center point thereof.

As shown in FIG. 6, as fruit half 23 is arcuately pivoted about its center point, cutting blade 44 continuously advances along the juncture between the inside surface of the skin and the outside surface of the edible fruit portion of fruit half 23. The passage of cutting blade 44 along the entire juncture between these two surfaces causes the skin of fruit half 23 to be separated from the edible fruit portion. Once the rotation of fruit half 23 is completed, the skin surface is totally removed. In addition, as shown in FIG. 7, the skin surface is directed into receiving member 50 during the removal process and, once completely removed from fruit half 23, the separated skin surface is directed to an accumulation zone connected to member 50, for subsequent disposal.

Simultaneously with a removal of the skin surface, seed scoop member 45 continuously accumulates the seeds retained in the center cavity of fruit half 23 as fruit half 23 is arcuately pivoted. Seed scoop member 45 is connected to receiving member 50, whereby the seeds are accumulated and subsequently disposed. If desired, separate receiving members 50 may be employed for the seeds and the outer skin.

As shown in FIG. 7, a fruit collecting member 51 is also positioned in cooperating association with fruit peeling head 22 for receiving the edible fruit portion of fruit half 23 once the outer skin and the seeds have been completely removed therefrom. Collection member 51 is preferably connected to suitable means for enabling the edible fruit portion to be automatically delivered for being processed in the desired manner.

As is evident from the foregoing detailed disclosure, the fruit processing system 20 of the present invention is capable of completely automated, high-speed processing of any desired fruit, completely removing the skin of the fruit, as well as any seeds associated therewith. By employing the present invention, completely automated peeling of the fruit is realized in a manner which assures efficient, low-cost delivery of the separated edible fruit portion of any desired fruit.

It will thus be seen that the objects set forth above, among those made apparent from the preceding description, are efficiently obtained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. High speed fruit processing apparatus constructed for receiving fruit segments incorporating an edible fruit portion and an outer skin substantially surrounding the edible fruit portion and for automatically removing the outer skin surface therefrom, said apparatus comprising:

A. a pair of spindles mounted in juxtaposed, spaced, side-to-side cooperating relationship and defining a fruit segment receiving zone formed thereby;
   B. each spindle being rotationally movable along its central axis and incorporating a fruit movement control surface formed thereon for receiving and controllably arcuately pivoting the fruit segment between a first raised position and a second lowered position; and
   C. a cutting blade,
      a. fixedly mounted in cooperating relationship with the fruit segment receiving zone and in juxtaposed spaced relationship with the fruit movement control surface of the spindles, and
      b. positioned for contacting the juncture between the inside surface of the skin and the outer surface of the edible fruit portion of the fruit segment when the fruit segment is in its raised position and for entering the juncture and separating the skin from the edible fruit portion as a fruit segment is arcuately pivoted into its second position;

whereby the outer skin surface of any desired fruit segment fed into the fruit segment receiving zone is automatically removed from the edible fruit portion in a rapid, efficient, easily obtained manner.

2. The high speed fruit processing apparatus defined in claim 1, further comprising separate and independent means for receiving and handling the separated outer skin of the fruit segment and receiving and processing the separated edible fruit portion.

3. The high speed fruit processing apparatus defined in claim 1, wherein the cutting blade is further defined as comprising a thin, elongated, narrow, substantially U-shaped blade member.

4. The high speed fruit processing apparatus defined in claim 3, wherein a plurality of U-shaped blade members are employed with each of said blade members incorporating different diameters, whereby the diameter of the blade member is able to substantially match the diameter of the fruit segment.

5. The high speed fruit processing apparatus defined in claim 1, wherein the movement control surface of each of said spindles is further defined as comprising a plurality of pin means formed therein for providing fractional engagement and movement control over the skin surface of the fruit segment.

6. The high speed fruit processing apparatus defined in claim 5, wherein said pin means is further defined as radially extending outwardly from the movement control surface of said spindle.

7. The high speed fruit processing apparatus defined in claim 1, wherein said spindles are further defined as being laterally movable relative to each other for adjusting the diameter of the fruit segment receiving zone.

8. The high speed fruit processing apparatus defined in claim 1, wherein each of said spindles are further defined as comprising a leading surface having a truncated conical shape with arcuately curved sides dimensioned for receiving a portion of the fruit segment.

9. The high speed fruit processing apparatus defined in claim 8, wherein the arcuately curved sides of each of said spindles comprises a radius of curvature ranging between about 70° and 90°.

10. The high speed fruit processing apparatus defined in claim 1, wherein said fruit is further defined as fruit selected from the group consisting of melons, honeydews, papayas, grapefruits, cantaloupes, and mangos.

11. The high speed fruit processing apparatus defined in claim 10, wherein said fruit segments are further defined as comprising a one-half segment of the fruit being processed.

12. The high speed fruit processing apparatus defined in claim 11, wherein said apparatus further comprises conveyor means positioned for receiving the fruit segment and delivering the fruit segment to the segment receiving zone of the spindles.

13. The high speed fruit processing apparatus defined in claim 12, wherein said conveyor means further comprises a fruit segment position adjuster cooperatively associated therewith for moving the fruit segment from any random position on conveyor means to a position substantially along the center line of the conveyor means.

14. The high speed fruit processing apparatus defined in claim 13, wherein said position adjuster is further defined as comprising an endless, V-shaped belt positioned for contacting the fruit segments and moving the fruit segments into the desired position.

15. The high speed fruit processing apparatus defined in claim 1, wherein said apparatus further comprises seed sack removal means cooperatively associated with the cutting blade and positioned for contacting the seed sack of a fruit segment and removing the seeds therefrom.

16. The high speed fruit processing apparatus defined in claim 15, wherein said seed sack removal means is further defined as comprising a scoop member mounted in cooperating relationship with the cutting blade, positioned for contacting the seed sack in said first position and continuously removing the seeds from the fruit segment as the fruit segment moves into its second position.

17. The high speed fruit processing apparatus defined in claim 16, wherein said apparatus further comprises separate collection means for receiving the seeds from the removal means and separating the seeds from the other components of the fruit segment.

18. A high speed, automatic, fruit processing system for receiving fruit segments incorporating an edible fruit portion and an outer skin substantially surrounding the edible fruit portion and for automatically removing the outer skin surface therefrom, said system comprising:

A. conveyor means constructed for receiving fruit segments and automatically advancing the fruit segments for processing; and B. processing apparatus comprising
        a. a pair of spindles mounted in juxtaposed, spaced, side-to-side cooperating relationship and defining a fruit segment receiving zone formed thereby;
        b. each spindle being rotationally movable along its central axis and incorporating a fruit movement control surface formed thereon for receiving and controllably arcuately pivoting the fruit segment between a first raised position and a second lowered position; and
        c. a cutting blade,
            1. fixedly mounted in cooperating relationship with the fruit segment receiving zone and in juxtaposed spaced relationship with the fruit movement control surface of the spindles, and
            b. positioned for contacting the juncture between the inside surface of the skin and the outer surface of the edible fruit portion of the fruit segment when the fruit segment is in its raised position and for entering the juncture and separating the skin from the edible fruit portion as a fruit segment is arcuately pivoted into its second position;

whereby the outer skin surface of any desired fruit segment fed into the fruit segment receiving zone is automatically removed from the edible fruit portion in a rapid, efficient, easily obtained manner.

19. The high speed fruit processing apparatus defined in claim 18, wherein said conveyor means further comprises a fruit segment position adjuster cooperatively associated therewith for moving the fruit segment from any random position on conveyor means to a position substantially along the center line of the conveyor means.

20. The high speed fruit processing apparatus defined in claim 19, wherein said apparatus further comprises seed sack removal means cooperatively associated with the cutting blade and positioned for contacting the seed sack of a fruit segment and removing the seeds therefrom.

\* \* \* \* \*